(12) United States Patent
Redford

(10) Patent No.: US 8,634,131 B2
(45) Date of Patent: Jan. 21, 2014

(54) SPHERICAL ABERRATION CORRECTION FOR NON-DESCANNED APPLICATIONS

(75) Inventor: Glen Ivan Redford, Arvada, CO (US)

(73) Assignee: Intelligent Imaging Innovations, Inc., Denver, CO (US)

( * ) Notice: Subject to any disclaimer, the term of this patent is extended or adjusted under 35 U.S.C. 154(b) by 274 days.

(21) Appl. No.: 12/958,165

(22) Filed: Dec. 1, 2010

(65) Prior Publication Data

US 2011/0141558 A1    Jun. 16, 2011

Related U.S. Application Data

(60) Provisional application No. 61/286,257, filed on Dec. 14, 2009.

(51) Int. Cl.
    *G02B 21/00* (2006.01)
(52) U.S. Cl.
    USPC .......................................... 359/379; 359/434
(58) Field of Classification Search
    USPC ................. 359/368–390, 423, 425, 426, 434
    See application file for complete search history.

(56) References Cited

U.S. PATENT DOCUMENTS

| | | | |
|---|---|---|---|
| 3,030,861 A | | 4/1962 | Mortimer et al. |
| 4,477,156 A * | | 10/1984 | Gebelein et al. ............. 359/364 |
| 5,054,896 A | | 10/1991 | Margolis |
| 6,473,228 B1 * | | 10/2002 | Toshimitsu .................. 359/368 |
| 6,563,634 B2 * | | 5/2003 | Shimada et al. ............. 359/368 |
| 2003/0063529 A1 | | 4/2003 | Iwata et al. |
| 2005/0207003 A1 | | 9/2005 | Kobayashi |
| 2010/0014155 A1 * | | 1/2010 | Hayashi ........................ 359/380 |
| 2010/0033812 A1 * | | 2/2010 | Fomitchov et al. .......... 359/383 |
| 2010/0172020 A1 * | | 7/2010 | Price et al. ................... 359/381 |
| 2011/0069381 A1 | | 3/2011 | Redford |
| 2011/0102887 A1 * | | 5/2011 | Redford ....................... 359/372 |
| 2012/0169864 A1 * | | 7/2012 | Birk ............................... 348/79 |

FOREIGN PATENT DOCUMENTS

JP    2004-311742    11/2004

OTHER PUBLICATIONS

European Search Report for European Patent Application No. 10010141.9, dated Feb. 23, 2011 7 pages.
European Search Report for European Patent Application No. 10015589.4, dated Mar. 18, 2011 4 pages.
U.S. Appl. No. 12/887,869, Redford, Filed Sep. 22, 2010.
Official Action for U.S. Appl. No. 12/887,869, mailed Dec. 26, 2012.
Notice of Allowance for U.S. Appl. No. 12/887,869, mailed Sep. 16, 2013.

* cited by examiner

*Primary Examiner* — Frank Font
(74) *Attorney, Agent, or Firm* — Jason H. Vick; Sheridan Ross, PC

(57) ABSTRACT

Spherical aberration is the primary cause of lose of signal while imaging deeper into a sample. Spherical aberration is corrected in the imaging path of a non-descanned detection system (such as a multi-photon microscope). This corrects the illumination spot for artifacts caused by imaging deep into a sample. One exemplary advantage to this instrument is that it allows deeper and brighter imaging.

18 Claims, 2 Drawing Sheets

SPHERICAL ABERRATION CORRECTION FOR NON-DESCANNED APPLICATIONS

RELATED APPLICATION DATA

This application claims the benefit of and priority under 35 U.S.C. §119(e) to U.S. Patent Application No. 61/286,257, filed 14 Dec. 2009, entitled "Spherical Aberration Correction for Non-Descanned Applications," which is incorporated herein by reference in its entirety.

FIELD

An exemplary aspect of this invention generally relates to spherical aberration correction in optical microscopes. More specifically, an exemplary embodiment of this invention relates to spherical aberration correction for non-descanned detection. Even more specifically, an exemplary embodiment of the invention relates to a spherical aberration correction device combined with a multi-photon imaging system.

BACKGROUND

High-power optical microscopes can use objectives with large numerical apertures (NA) resulting in high resolution imaging. In the case of oil or water immersion objectives these NAs can exceed 1.0. In any optical system, the first aberration that causes loss of signal and resolution is spherical aberration. Spherical aberration is the artifact in an imaging system caused by the inability of the optical system to focus axial and off-axis light from a point source to a single point. Modern objectives are highly corrected for spherical aberration, using multiple lens elements to eliminate the effect. However, these objectives are corrected only for a single ideal situation (e.g., for a specific cover glass thickness for samples on the cover glass). In practice, moving deeper into the sample introduces spherical aberration and is usually the limiting factor in deep imaging with these objectives. This is true especially in the case of multi-photon microscopy, which is intended for deep imaging, the sample of interest is rarely in the objective's ideal location.

SUMMARY

An exemplary aspect of this invention is related to U.S. patent application Ser. No. 12/887,869, entitled, "Spherical Aberration Correction for an Optical Microscope using a Moving Infinity-Conjugate Relay," (3766-7), filed 22 Sep. 2010, by the same inventor and which is incorporated herein by reference in its entirety.

A common optical microscope configuration when simplified includes an infinity objective and a tube lens. The sample is imaged a specific distance from the objective and at the back focal length of the tube lens the magnified image is created. This image could be recorded by a camera or other imaging device, but in the case of non-descanned detection, the whole signal is combined and measured as a single scalar. For creating an image, the angle of the illumination beam on the back aperture of the objective is changed so that the focal point is also changed. Most objectives are made so that points off the axis and in the focal plane are correctly relayed to the plane of the image. Points out of the focal plane (above or below) are also relayed and measured by the non-descanned detector. In the case of a multi-photon instrument, it is known that the entire signal comes from the focal point. By changing the convergence of the illumination beam on the back aperture of the objective, the focal point can be moved up or down along the optical axis.

Because points above and below the ideal plane (that created by a parallel illumination at the back aperture of the objective) are no longer at the specified ideal location for the objective, spherical aberration will be introduced for these points. Consecutively worse spherical aberration will occur as the focus is moved away from the "ideal" image plane. Spherical aberration has a "direction" to it in that the point-spread-function (PSF) is distorted along the z-axis in one direction or another. Thus one can assign a positive and negative spherical aberration of varying degree.

When the sample being imaged is no longer at the specified ideal situation for the given objective, the image of the "ideal" focal plane will have spherical aberration. The true ideal focal plane (with no spherical aberration) will be located above or below the original plane. As the sample moves further from the ideal condition, the spherical aberration free image will move further from the original plane. For any of these conditions, one should be able to move the focal point to the plane that represents the spherical aberration free focal plane. Thus by changing the convergence of the illumination light, one could correct for spherical aberration across a broad range of samples and imaging conditions. In most situations a variable optical relay can be employed to change the plane of the image volume that is recorded.

Accordingly, one exemplary embodiment of the invention is directed toward a moving optical relay system for selecting a plane of interest from the sample. If this relay were to be motorized as well as the focus of the microscope, one could in an automated fashion correct for the spherical aberration in the current sample plane. Typically this would involve software to select the position of the relay based on the quality of the image.

Primarily, there are two sources of spherical aberration in a given sample. The first is due to the conditions of the sample—usually variations in the thickness of the cover glass. This source of aberration is usually invariant over the sample, but is very hard to predict. To correct for this, the sample must be directly measured and the best plane of interest of the image volume chosen based on the measurement of the sample at several planes. The second source of aberration is due to imaging deeper into the sample. The spherical aberration varies with depth for any given sample medium for any given objective in a known manner. An algorithm can be developed that will give the plane of the image volume needed for any given depth of the sample. The end result is that one has a curve that represents the change in plane location vs. sample depth and a random offset to this curve caused by the sample. The offset can be found empirically and then any depth in the sample can be corrected using the calculated curve.

In the case of multi-photon, spherical aberration directly affects the PSF of the illumination which has a large effect on the multi-photon PSF. Often loss of signal and resolution when imaging deep is attributed to scattering, when for most samples it is due to spherical aberration. When corrected for spherical aberration, a multi-photon system would be able to image deeper and have better signal and resolution.

There are many optical ways that one could take the illumination beam which is usually a laser for multi-photon instruments which is collimated and change its divergence as it hits the back aperture of the objective. This optical system would have to be coupled to the scanner if it exists and usually would also involve the tube lens of the microscope.

One exemplary variable relay system involves two positive lenses. The first lens is placed the distance of its focal length from the image plane. By moving this lens, the desired image plane can be selected. The second lens is placed its focal length from the detector. The image plane that is the focal length of the first lens away will be relayed at infinity to the second lens which images it to an image plane. In this way, the image plane can be fixed in its location, while only one lens element needs to be moved. For scanning based systems, this image plane is then the image plane created by the scan lens. Ideally the distance between the two lenses is equal to the sum of their focal lengths. As the first lens moves, this ideal situation will change, with the primary consequence being that the second lens must be of greater diameter. If positioned correctly and if the two lenses are equal, a "zero" point can be established where the original focal plane is created with no additional magnification or distortion.

In accordance with another exemplary embodiment, one could use a fast, accurate linear motion device to move the first lens. This would allow the possible application where the position of the lens is continuously varied as the imaging condition varies (usually by moving deeper in the sample). For example this could allow three-dimensional imaging where each plane in z is individually corrected for spherical aberration. In practice such a device would allow for deeper imaging into a sample.

An exemplary aspect of the invention is directed toward an apparatus comprising:

a non-descanned optical instrument such as a multi-photon microscope; and a variable optical system for changing the convergence of the illumination beam on the back aperture of the objective.

This apparatus when combined would provide a way to correct for spherical aberration in an automated fashion.

This device has at least one exemplary advantage that when it is in the "zero" position it effectively has no effect on the image—as if the device were not present. This allows the microscope to be used in a normal fashion when spherical aberration correction is not desired or needed. Because this device can also be made with fast motion control, it will allow for spherical aberration correction without affecting the system performance.

Aspects of the invention are thus directed toward spherical aberration correction in optical microscopes.

Still further aspects of the invention are directed toward spherical aberration correction for non-descanned detection.

Even further aspects of the invention are directed toward a spherical aberration correction device combined with a multi-photon imaging system.

Still further aspects of the invention are directed toward a motorized lens system for selecting the convergence of the illumination beam on the back aperture of the objective.

Even further aspects of the invention are directed toward a fast linear motion device such that the desired motion can happen in less than the retrace time for a scanner system.

Even further aspects of the invention are directed toward automated control and software for the device.

Still further aspects of the invention relate to an apparatus for a spherical aberration correction system for non-descanned detection including:

an optical imaging system such as a microscope for non-descanned detection such as multi-photon; and an optical system for selecting the convergence of the illumination beam on the back aperture of the objective.

The aspects above, where the optical system is motorized.

The aspects above, where the optical system is motorized by using a moving coil actuator.

The aspects above, where the optical system is motorized using a stepper-motor.

The aspects above, where the optical system is moved using a manual focusing device.

The aspects above, where the motorization control device is synchronized with a scanner and/or a detector.

The aspects above, where the means for moving the optics can do so in under the retrace time of the scanning.

The aspects above, where the imaging system is an optical microscope.

The aspects above, where the apparatus is combined with an electronic imaging device such as a camera.

The aspects above, where the apparatus is combined with a scanning microscope.

The aspects above, where the scanning microscope is a confocal microscope.

The aspects above, where the scanning microscope is a multi-photon microscope.

The aspects above, where the apparatus has a "zero" mode where the effective image is unaltered from the image were the apparatus not present.

The aspects above, where the apparatus is automated and controlled with a computer program.

The aspects above, where the computer program uses a calculated curve to determine the position of the first lens for a given sample depth.

These and other features and advantages of this invention are described and, or are apparent from, the following detailed description of the exemplary embodiment.

BRIEF DESCRIPTION OF THE DRAWINGS

The exemplary embodiments of the invention will be described in detail, with reference to the following figures wherein.

DETAILED DESCRIPTION

The exemplary embodiments of this invention will be described in relation to microscopes, imaging systems, and associated components. However, it should be appreciated that, in general, known components will not be described in detail. For purposes of explanation, numerous details are set forth in order to provide a thorough understanding of the present invention. It should be appreciated however that the present invention may be practiced in a variety of ways beyond the specific details set forth herein.

Figure 1:
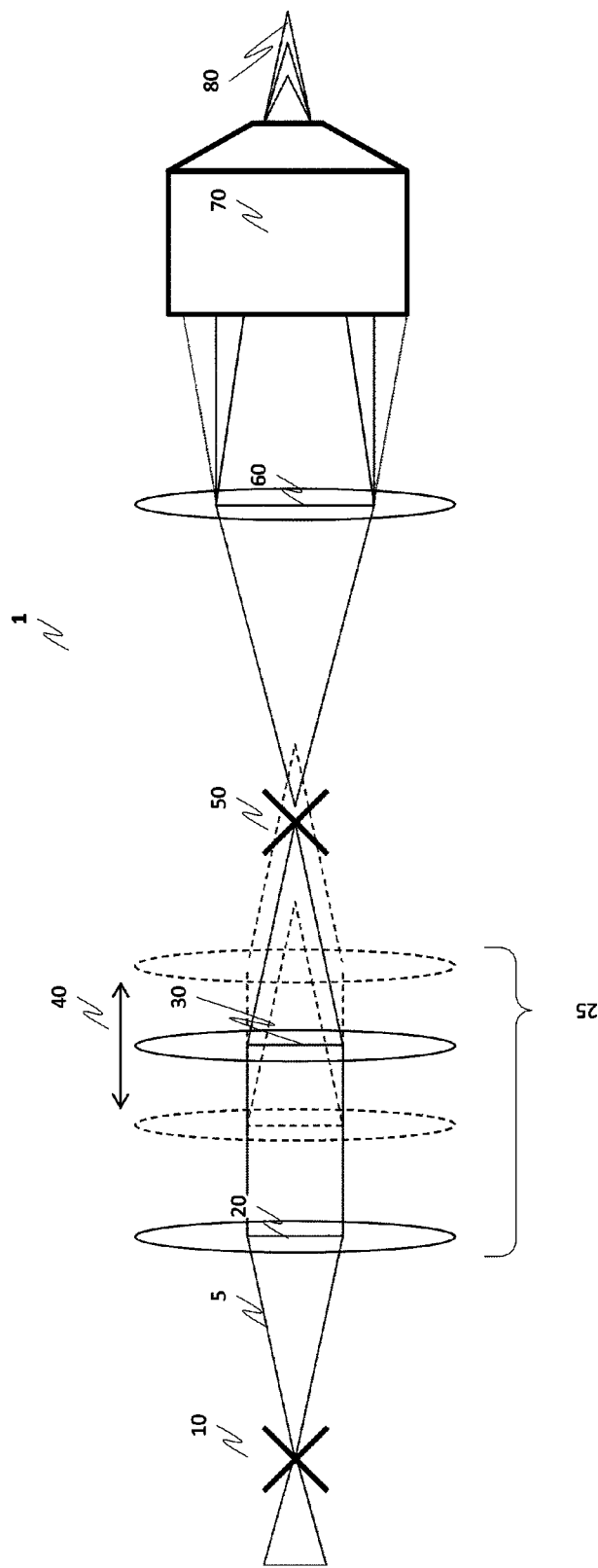
FIG. 1 illustrates an exemplary optical system for correcting spherical aberration by modifying the illumination path.

FIG. 1 illustrates an exemplary optical system 1 for modifying the illumination path to correct for spherical aberration. The optical system 1, in addition to well known componentry and motors/controllers, comprises a focal plane 10, a front lens 20, a back lens 30, focal plane 50, tube lens 60, objective 70 and focal point 80.

In operation, the scan lens creates a focal plane 10 and the light 5 is collected by the front lens 20 of an infinity conjugate relay 25. The light is then collimated until the back lens 30, which can move along the optical axis 40 with the assistance of a motor/controller module (not shown). The focal plane 50 of the tube lens 60 can then be before or after the focal point from the moving lens. The result is that the convergence of the light when the light hits the back aperture of the objective 70 is then controlled. As the light changes from convergent to divergent, the focal point 80 moves closer and further from the objective. In this manner, the position of the focal point along the optical axis of the excitation light can be controlled with motion of the lens 30.

Figure 2:
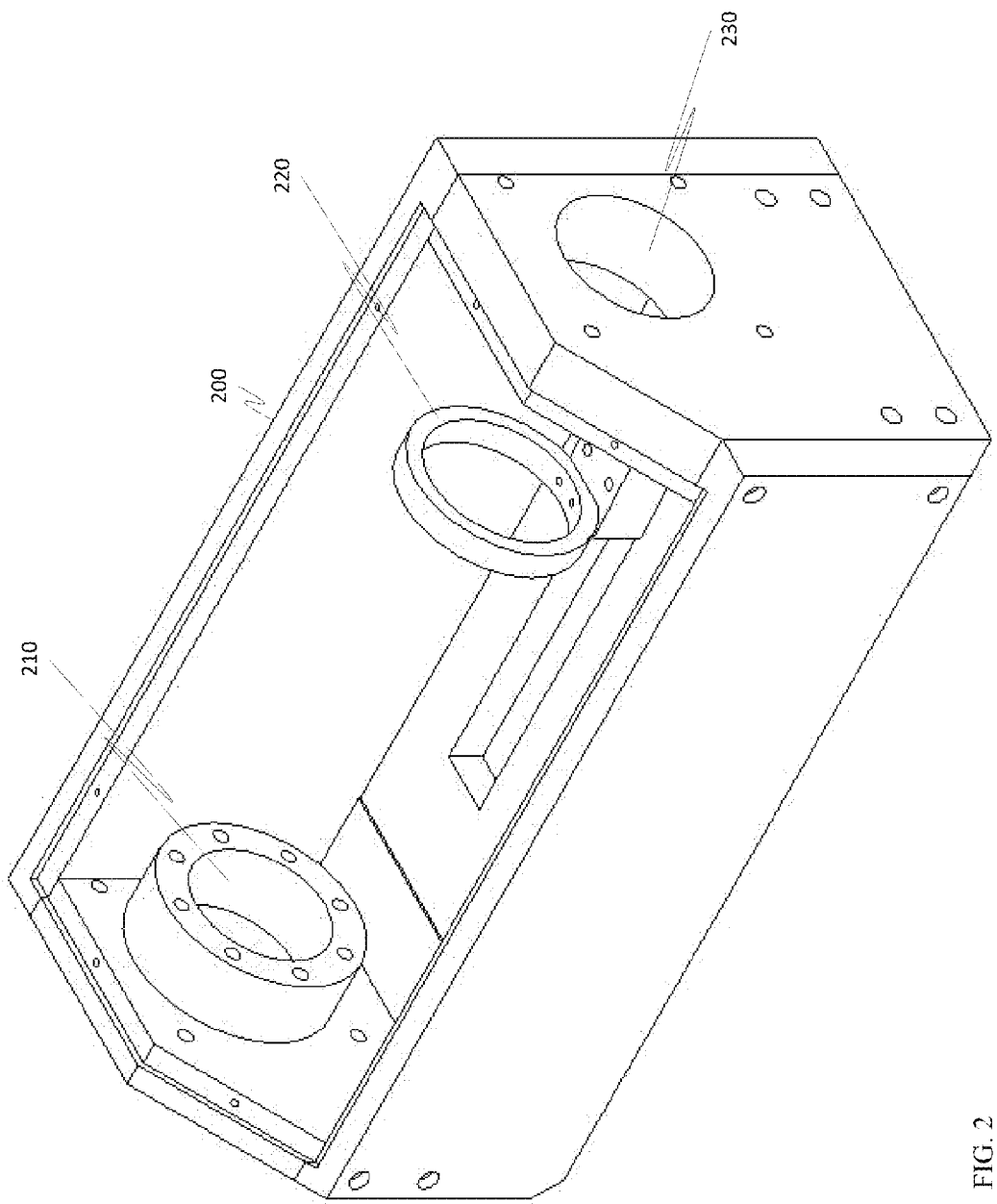
FIG. 2 illustrates an exemplary embodiment of the device as illustrated in FIG. 1.

FIG. 2 illustrates an exemplary environmental perspective view of the embodiment of the optical imaging system as shown in FIG. 1. The optical system includes an enclosure 200 housing port 210, moving lens assembly 220 and port 230. This optical system includes the stationary and moving lens elements of the infinity conjugate relay 25. The input illumination beam enters through port 210. The beam is collimated and hits the moving lens assembly 220 and then exits the device at the back port. This optical system can be directly attached to an entrance port of a microscope (not shown), between, for example, the scanning system and the microscope via well known attachment mechanism(s).

The exemplary techniques illustrated herein are not limited to the specifically illustrated embodiments but can also be utilized with the other exemplary embodiments and each described feature is individually and separately claimable.

The systems of this invention also can cooperate and interface with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any comparable means, or the like. The term module as used herein can refer to any known or later developed hardware, software, firmware, or combination thereof, that is capable of performing the functionality associated with that element. The terms determine, calculate, and compute and variations thereof, as used herein are used interchangeable and include any type of methodology, process, technique, mathematical operational or protocol.

Furthermore, the disclosed system may use control methods/systems and graphical user interfaces that may be readily implemented in software/hardware using object or object-oriented software development environments that provide portable source code that can be used on a variety of computer or workstation platforms that include a processor and memory. Alternatively, the disclosed control methods may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

It is therefore apparent that there has been provided, in accordance with the present invention an optical system. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A spherical aberration correction device for non-descanned detection comprising:
an optical imaging system adapted for non-descanned detection; and
an optical system including a motorized lens system that includes a stationary lens and a moveable lens located on a back aperture side of an objective, the motorized lens system adapted to move the moveable lens relative to the stationary lens to select a convergence of illumination on a back aperture of the objective, the convergence of illumination correcting spherical aberration.

2. The system of claim 1, where the optical imaging system is a microscope.

3. The system of claim 2, where the microscope is a scanning microscope.

4. The system of claim 3, where the scanning microscope is adapted for multi-photon imaging.

5. The system of claim 1, where the optical system is a variable optical relay.

6. The system of claim 1, where the optical system is motorized.

7. The system of claim 5, wherein the movable back lens shifts a location of a focal plane between the movable back lens and a tube lens.

8. The system of claim 6, where the optical system is controlled electronically by one or more of a computer and an electronic device.

9. The system of claim 8, wherein the electronic device adjusts for spherical aberration based only on image data.

10. The system of claim 6, wherein the optical system can move during a retrace time of a scanner.

11. The system of claim 6, wherein the optical system can move during imaging.

12. The system of claim 1, wherein spherical aberration is corrected for each plane individually in a three-dimensional data set.

13. The system of claim 8, wherein a controller uses a stored equation or numerical formula to adjust the spherical aberration correction for any given sample depth.

14. The system of claim 13, wherein the controller automatically adjusts the correction during live imaging.

15. The system of claim 13, wherein the controller uses an empirically derived offset to the correction to account for sample conditions.

16. The system of claim 1, wherein the optical imaging system is not used for imaging, but detects a signal from a single point, line or other arbitrary shape.

17. The system of claim 3, wherein resulting data is not processed for imaging, but is processed to provide other information about a sample including one or more of flow rates and diffusion.

18. An optical system for spherical aberration correction for non-descanned detection comprising:
an enclosure housing further comprising:
an objective,
a stationary front lens located on a back aperture side of the objective,
a movable back lens located on the back aperture side of the objective,
a tube lens, and
a motor adapted to move the moveable back lens relative to the stationary front lens to select a convergence of illumination on a back aperture of the objective,
wherein light collected by the stationary front lens from a scan lens is collimated until it reaches the movable back lens, the movable back lens being movable along an optical axis and controllable by the motor based on a stored equation or numerical formula to adjust spherical aberration correction, with the tube lens adapted to converge the light.

* * * * *